(12) United States Patent
Ruhland et al.

(10) Patent No.: US 9,644,575 B2
(45) Date of Patent: May 9, 2017

(54) METHODS FOR NOX REDUCTION USING EXHAUST-GAS CONDENSATE

(71) Applicant: Ford Global Technologies, LLC, Dearborn, MI (US)

(72) Inventors: Helmut Hans Ruhland, Eschweiler (DE); Werner Willems, Aachen (DE); Claudia Katharina Herudek, Aachen (DE); Claudia Conee, Aachen (DE); Guohui Chen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 14/148,584

(22) Filed: Jan. 6, 2014

(65) Prior Publication Data

US 2014/0190148 A1  Jul. 10, 2014

(30) Foreign Application Priority Data

Jan. 9, 2013 (DE) ........................ 10 2013 200 185

(51) Int. Cl.
| | |
|---|---|
| *F02M 25/07* | (2006.01) |
| *F02M 25/028* | (2006.01) |
| *F02M 25/022* | (2006.01) |
| *F01N 3/00* | (2006.01) |

(52) U.S. Cl.
CPC ......... *F02M 25/0735* (2013.01); *F01N 3/005* (2013.01); *F02M 25/028* (2013.01); *F02M 25/0222* (2013.01); *Y02T 10/121* (2013.01); *Y02T 10/20* (2013.01)

(58) Field of Classification Search
CPC ........... F02M 25/0735; F02M 25/0738; F02M 25/0707; F02M 25/0715; F02M 25/074; F02M 25/0222; F02M 25/028; F01N 3/005
See application file for complete search history.

(56) References Cited

U.S. PATENT DOCUMENTS

| | | | | |
|---|---|---|---|---|
| 3,983,882 A | * | 10/1976 | Billings ................. | F02B 43/10 123/1 A |
| 6,637,382 B1 | * | 10/2003 | Brehob ................... | F02B 47/02 123/25 J |
| 2003/0114978 A1 | * | 6/2003 | Rimnac ............... | F02B 29/0418 701/108 |
| 2008/0092539 A1 | * | 4/2008 | Marshall ................... | F01P 9/02 60/599 |

(Continued)

FOREIGN PATENT DOCUMENTS

WO  0192710 A1  12/2001

*Primary Examiner* — Jacob Amick
(74) *Attorney, Agent, or Firm* — Julias Voutyras; Alleman Hall McCoy Russell & Tuttle LLP

(57) ABSTRACT

The system and methods described allow for reduce emissions by using a recirculation device within an engine that connects an air feed line to an exhaust line while cooling the exhaust-gas to form a condensate for further cooling the engine system. In one particular example, a cooling unit is described that cools the exhaust-gas stream flowing there through and collects a condensate out of the exhaust-gas stream for injection back into the air feed line via an injecting device. In this way, an injection of water may be made to reduce NOx emissions during vehicle operations, and the outlay for storage of water on board the vehicle may be eliminated.

18 Claims, 8 Drawing Sheets

(56) References Cited

U.S. PATENT DOCUMENTS

2010/0326399 A1* 12/2010 Pendray .................... F01B 1/12
123/25 J
2012/0247716 A1* 10/2012 Galtz ................. B60H 1/00278
165/42

* cited by examiner

METHODS FOR NOX REDUCTION USING EXHAUST-GAS CONDENSATE

CROSS REFERENCE TO RELATED APPLICATIONS

The present application claims priority to German Patent Application No. 102013200185.1, filed on Jan. 9, 2013, the entire contents of which are hereby incorporated by reference for all purposes.

FIELD

The present description relates to a recirculation device for an internal combustion engine, to a combustion apparatus having a recirculation device of said type, to a motor vehicle having a combustion apparatus of said type, and to a method for operating a combustion apparatus.

BACKGROUND AND SUMMARY

Owing to ever-increasing demands on the purity of exhaust-gas released from motor vehicles, methods are sought to reduce the formation of emissions during the combustion of fuel within the engine, and to chemically or physically convert emissions formed into more inert substances. In particular, a reduction in the emissions of nitrogen oxides, commonly referred to as NOx for short, is sought. In the case of large engines such as diesel engines, it is known to admix water as vapor or as a spray mist into the combustion air of the engine. However, this approach is scarcely used in motor vehicles and has been realized only occasionally in heavy goods vehicles. In particular, in the case of passenger motor vehicles, the reduction in the emissions of NOx through the admixing of water into the combustion air is not presently used because such measures are often associated with considerable additional outlay for the storage of water, which has a disadvantage in that the water must be replenished at regular intervals. Moreover, disadvantages arise in that the water carried onboard in this way can freeze at low ambient temperatures.

The inventors have recognized issues with such approaches and herein describe a recirculation device for an internal combustion engine that is configured to recirculate a portion of exhaust-gas through a recirculation device and into an air feed line coupled to the exhaust line. Moreover, according to the present disclosure, the recirculation device further includes a condensate collecting device that is designed to collect condensate out of the exhaust-gas stream cooled in the cooling unit and to conduct said condensate to the air feed line wherein an injection device may be included for injecting the condensate into the combustion air. As such, the air feed line, which may be designed to draw in combustion air and conduct the air to the engine, may be admixed with the injected condensate. Furthermore, the exhaust line that is designed to discharge an exhaust-gas stream from the engine may also include a cooling unit that is included to cool the exhaust-gas stream flowing therethrough in order to induce the generation of condensate formation.

In one example, a system and methods is based upon the insight that the engine exhaust gas comprises a high fraction of water vapor. In this way, the technical result is achieved that the high fraction of water vapor within the exhaust gas may be further used for the reduction of NOx emissions by injecting the condensed water into the combustion air of the engine in order to lower a combustion temperature within the engine. As such, systems and methods are conceived of wherein the NOx emissions may be reduced without using a user-refillable water tank, which thereby reduces space requirements on-board a vehicle, and also reduces a vehicle weight and operating complexities for the driver. Furthermore, a method according to the present disclosure eliminates problems with regard to the freezing of the water store carried onboard the vehicle.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
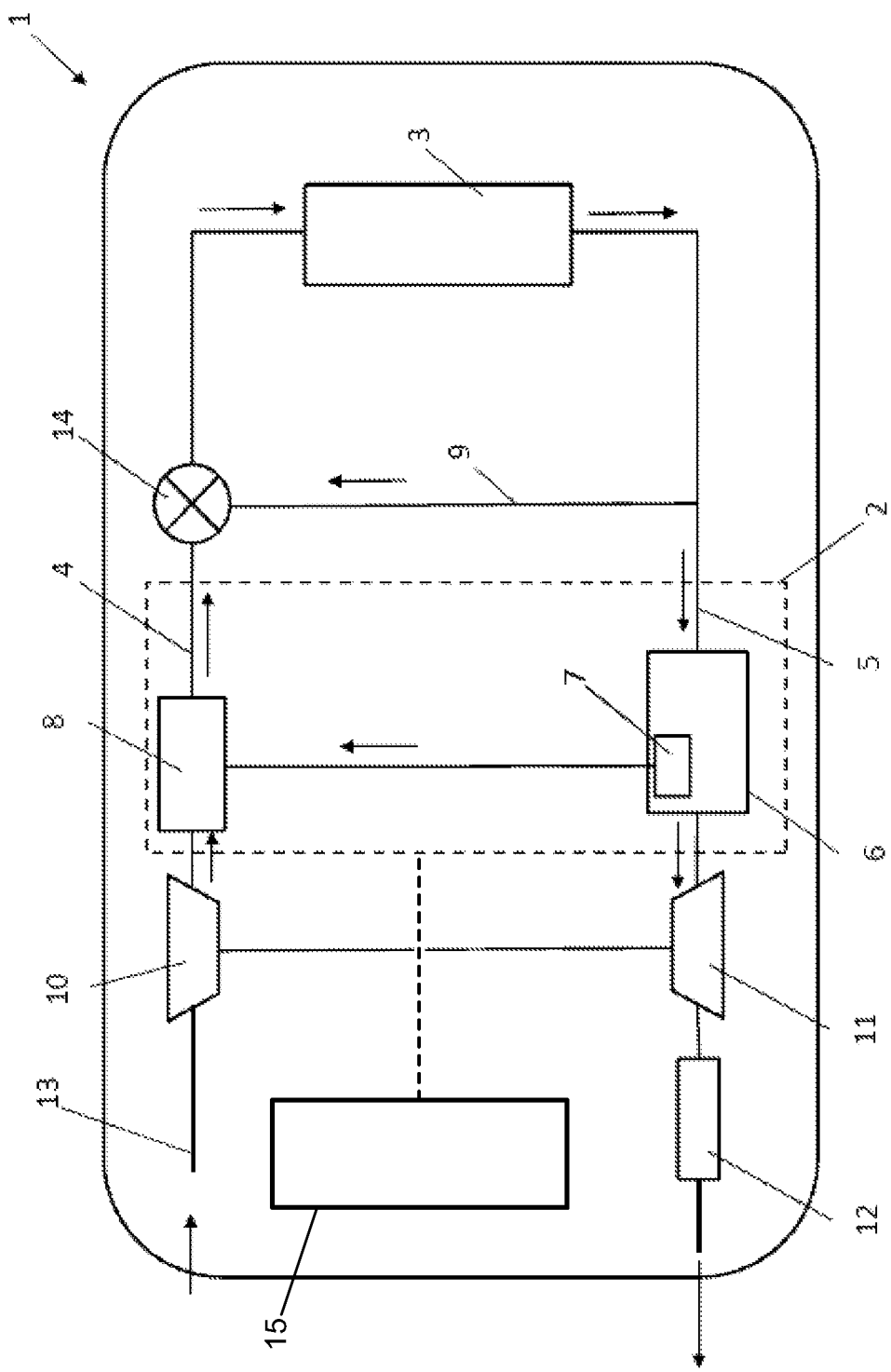
FIG. 1 shows an example block diagram of a motor vehicle.
Figure 2:
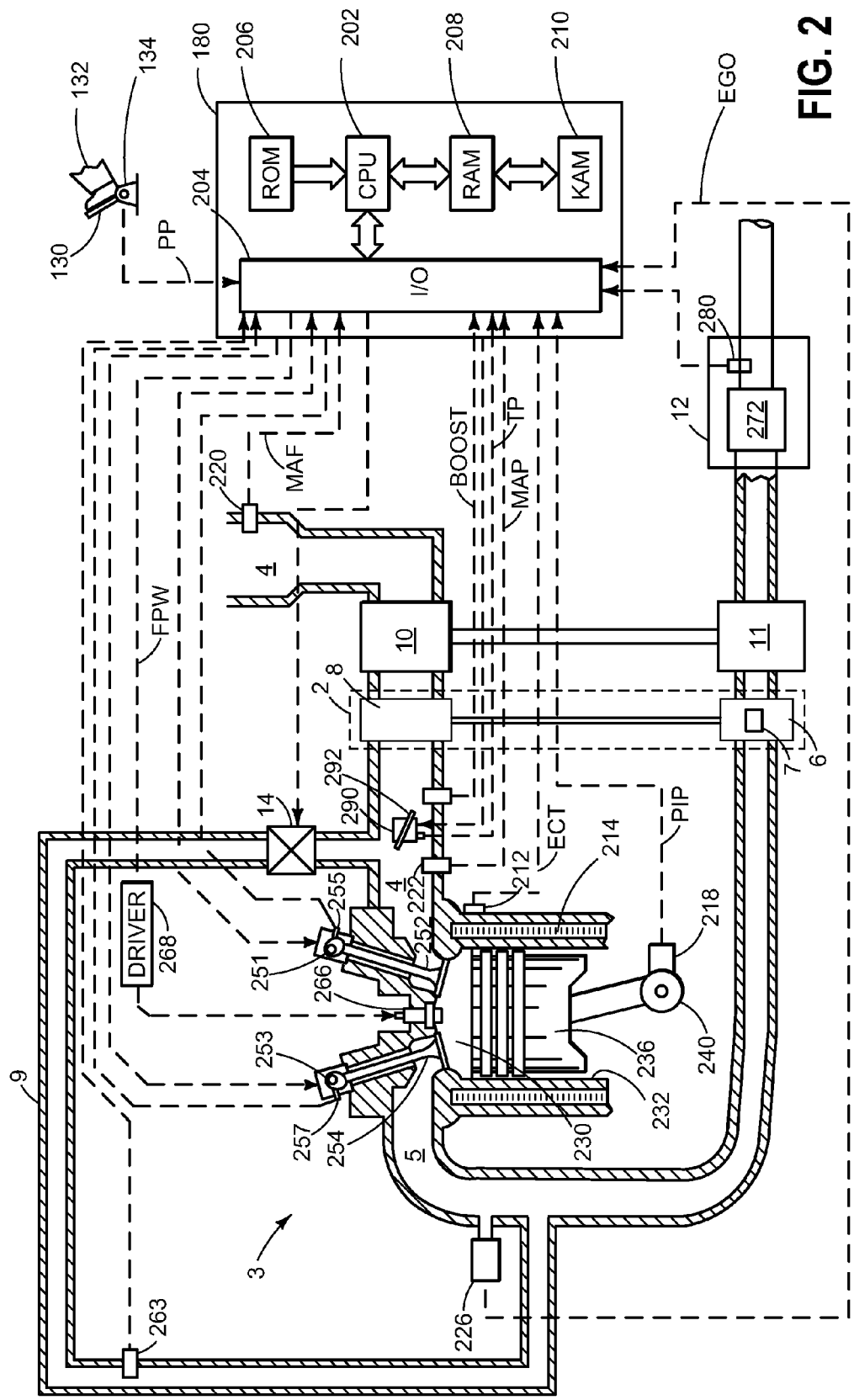
FIG. 2 shows a schematic diagram of one cylinder of multi-cylinder engine.

An engine comprising a recirculation device according to the present disclosure allows the exhaust line to be coupled to the air feed line via a cooling unit for collecting condensate on board the vehicle during operation. In this way, the recirculation device described may collect condensate from the exhaust-gas stream and further conduct the collected condensate to the air feed line for injection into the combustion air to cool the engine and thereby reduce NOx emissions therefrom. For this reason, exemplary vehicle diagrams are shown in FIGS. 1 and 2 to illustrate one possible configuration of the disclosed recirculation device. Example flow charts shown in FIGS. 3-8 further illustrate various methods for using the disclosed recirculation device to adjust an amount of water vapor formed and used within the example engine system.

Turning to a description of the system, FIG. 1 shows a block diagram of a motor vehicle according to the present disclosure. As shown, motor vehicle 1 includes recirculation device 2 connected to internal combustion engine 3. Therein, combustion air that is supplied to the engine may be drawn into air feed line 4 by compressor 10 through air filter 13. As one example, the engine may be configured to burn fuel, for example gasoline or diesel oil, with the combustion air and thus generate a drive power for driving motor vehicle 1. Then, exhaust-gas generated during combustion is discharged from the engine via exhaust line 5. As will be described in greater detail below, a part of the exhaust-gas may be recirculated and admixed to the combustion air via an exhaust-gas recirculation (EGR) means comprising one or more exhaust-gas recirculation lines 9 and mixing valve 14 in order to reduce pollutant emissions. According to the present disclosure, exhaust line 5 further includes a recirculation device 2 with a cooling unit 6 that is designed to cool an exhaust-gas stream of engine 3 flowing through the cooling unit. In this way, a second line is included downstream of the EGR for collecting and recirculating condensate back into the engine via the air intake system. The system and methods are based on the insight that a high fraction of water vapor is contained in the exhaust-gas that may be condensed in cooling unit 6 to form a condensate comprising substantially water (herein also referred to as water). Condensate generated may be collected by a condensate collecting device arranged within recirculation device 2, and further conducted to an injection device 8 that communicates with air feed line 4 (e.g., an intake manifold). In one embodiment, the collecting device may be configured as an injection device for injecting the condensate into the combustion air, for example, in the form of water vapor or an atomized spray mist. However, in another embodiment, the injection may occur based on a flow of air flowing through the air feed line in what is known as the Venturi effect.

When one or more exhaust-gas recirculation lines 9 (e.g., an exhaust-gas recirculation means) is provided along with recirculation device 2, cooling unit 6 may be arranged downstream of the exhaust-gas recirculation means 9 such that a first portion (or a part) of the exhaust gas is recirculated back into air feed line 4 without having any water vapor condensed therefrom. As such, the remaining second portion may directed downstream to recirculation device 2 to be cooled in cooling unit 6. In some embodiments, recirculation device 2 may include a housing for protecting the structural elements related to the condensing and injecting of the condensate, whereas in other embodiments, the recirculation device may simply comprise an additional line for recirculating condensate collected to the air feed line for injecting the condensate therein. Further, as shown schematically in FIG. 1, in some embodiments, recirculation device 2 may be arranged substantially parallel to the one or more exhaust-gas lines 9.

Because the condensation process removes water vapor from the exhaust-gas, a third portion of exhaust-gas that has water vapor extracted from it may be discharged from the engine via an exhaust tailpipe. In addition, exhaust line 5 may include an exhaust-gas turbine 11 that is set in rotation by the exhaust-gas stream which drives the compressor 10. Furthermore, an exhaust-gas aftertreatment means 12 for filtering or for the catalytic reduction of pollutants (e.g., a catalyst) may also be provided. Likewise, air feed line 4 may include compressor 10 arranged upstream of the injection device 8. Otherwise, if injection of the condensate were to occur upstream of compressor 10, an undesired result may be obtained wherein a re-condensation of the injected condensate may occur due to the compression. Because cooling unit 6 resides in the engine compartment, in some embodiments, the cooling unit of the recirculation device may be further coupled to an air-conditioning system of a motor vehicle, for example to introduce a cool airflow into vehicle cabin 15.

FIG. 2 is a schematic diagram showing one cylinder of multi-cylinder engine, which may be included in a propulsion system of a motor vehicle. As described herein, engine 3 may be controlled at least partially by a control system 180 (also referred to as a controller) and by input from a vehicle operator 132 via an input device 130. Combustion chamber (e.g., a cylinder) 230 of engine 3 may include combustion chamber walls 232 with piston 236 positioned therein. In some embodiments, the face of piston 236 inside cylinder 230 may have a bowl. Piston 236 may be coupled to crankshaft 240 so that reciprocating motion of the piston is translated into rotational motion of the crankshaft. Crankshaft 240 may be coupled to at least one drive wheel of a vehicle via an intermediate transmission system. Furthermore, a starter motor may be coupled to crankshaft 240 via a flywheel to enable a starting operation of engine 3.

Combustion chamber 230 may receive intake air from intake manifold 4 via an intake passage and may exhaust combustion gases via exhaust passage 5. Intake manifold 4 and exhaust passage 5 can selectively communicate with combustion chamber 230 via respective intake valve 252 and exhaust valve 254. In some embodiments, combustion chamber 230 may include two or more intake valves and/or two or more exhaust valves.

Intake valve 252 may be controlled by controller 180 via electric valve actuator (EVA) 251. Similarly, exhaust valve 254 may be controlled by controller 180 via EVA 253. During some conditions, controller 180 may vary the signals provided to actuators 251 and 253 to control the opening and closing of the respective intake and exhaust valves. The position of intake valve 252 and exhaust valve 254 may be determined by valve position sensors 255 and 257, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 230 may alternatively include an intake valve controlled via electric valve actuation and an exhaust valve controlled via cam actuation including CPS and/or VCT.

During operation, each cylinder within engine 3 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 4, and piston 236 moves to the bottom of the cylinder so as to increase the volume within combustion chamber 230. The position at which piston 236 is near the bottom of the cylinder and at the end of its stroke (e.g. when combustion chamber 230 is at its largest volume) is typically referred to by those of skill in the art as bottom dead center (BDC). During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g. when combustion chamber 230 is at its smallest volume) is typically referred to by those of skill in the art as top dead center (TDC). In a process hereinafter referred to as fuel injection, fuel is introduced into the combustion chamber. In a process hereinafter referred to as ignition, the injected fuel is ignited by known ignition means such as a spark plug (not shown), resulting in combustion. In some embodiments, spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. During the expansion stroke, the expanding gases push piston 236 back to BDC. Crankshaft 40 converts piston movement into a rotational torque of the rotary shaft. Crankshaft 240 may be used to drive an alternator. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

Fuel injector 266 is shown coupled directly to combustion chamber 230 for injecting fuel directly therein. Fuel injection may be via a common rail system, or other such diesel fuel injection system. Fuel may be delivered to fuel injector 266 by a high pressure fuel system (not shown) including a fuel tank, a fuel pump, and a fuel rail. In some embodiments, cylinder 230 may include a spark plug, which may be actuated by an ignition system. A fuel injector 266 may be provided in the cylinder to deliver fuel directly thereto. However, in other embodiments, the fuel injector may be arranged within intake manifold 4 upstream of intake valve 252 to deliver what is known as port fuel injection. Fuel injector 266 may be actuated by a driver 268.

Intake passage 4 may include a throttle 290 having a throttle plate 292. In this particular example, the position of throttle plate 292 may be varied by controller 180 via a signal provided to an electric motor or actuator included with throttle 290, a configuration that is commonly referred to as electronic throttle control (ETC). In this manner, throttle 290 may be operated to vary the intake air provided to combustion chamber 230 among other engine cylinders. The position of throttle plate 292 may be provided to controller 180 by throttle position signal TP. Intake passage 4 may include a mass air flow sensor 220 and a manifold air pressure sensor 222 for providing respective signals MAF and MAP to controller 180.

Further, in the disclosed embodiments, an EGR system may route a desired portion of exhaust gas from exhaust line 5 to air feed line 4 (e.g., an intake passage) via EGR passage 9. The amount of EGR provided to intake passage 4 may be varied by controller 180 via mixing valve 14, herein also referred to as an EGR valve. Further, an EGR sensor 263 may be arranged within the EGR passage and may provide an indication of one or more pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. While FIG. 2 shows a high pressure EGR system, alternatively, a low pressure EGR system may be used where EGR is routed from downstream of a turbine of a turbocharger to upstream of a compressor of the turbocharger.

Engine 3 may further include a compression device such as a turbocharger or supercharger including at least a compressor 10 arranged along the intake manifold. For a turbocharger, compressor 10 may be at least partially driven by a turbine 11 (e.g., via a shaft) arranged along exhaust passage 5. For a supercharger, compressor 10 may be at least partially driven by the engine and/or an electric machine, and may not include a turbine. Thus, the amount of compression provided to one or more cylinders of the engine via a turbocharger or supercharger may be varied by controller 180.

Exhaust gas sensor 226 is shown coupled to exhaust passage 5 upstream of exhaust-gas aftertreatment means 12. Sensor 226 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, and/or CO sensor. As described herein, aftertreatment system 12 may include one or more of a diesel oxidation catalyst (DOC), selective catalytic reduction (SCR) system, three way catalyst (TWC), NOx trap, various other emission control devices, or combinations thereof. Further, aftertreatment system 12 may include an exhaust gas sensor 280. Sensor 280 may be any suitable sensor for providing an indication of a concentration of exhaust gas constituents such as a $NO_x$, $NH_3$, or EGO sensor, for example. In addition, sensor 280 may be a temperature or pressure sensor in some instances.

Controller 180 is shown in FIG. 2 as a microcomputer, including microprocessor unit 202, input/output ports 204, an electronic storage medium for executable programs and calibration values shown as read-only memory chip 206 in this particular example, random access memory 208, keep alive memory 210, and a data bus. Controller 180 may receive various signals from sensors coupled to engine 3, in addition to those signals previously discussed, including measurement of inducted mass air flow (MAF) from mass air flow sensor 220; engine coolant temperature (ECT) from temperature sensor 212 coupled to cooling sleeve 214; a profile ignition pickup signal (PIP) from Hall effect sensor 218 (or other type) coupled to crankshaft 240; throttle position (TP) from a throttle position sensor; and absolute manifold pressure signal, MAP, from sensor 222. Engine speed signal, RPM, may be generated by controller 180 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 218, which is also used as an engine speed sensor, may produce a predetermined number of equally spaced pulses every revolution of the crankshaft. Storage medium read-only memory 206 can be programmed with computer readable data representing instructions executable by processor 202 for performing the methods described below as well as other variants that are anticipated but not specifically listed.

As described above, FIG. 2 shows only one cylinder of a multi-cylinder engine, and each cylinder may similarly include its own set of intake/exhaust valves, fuel injector, spark plug, etc.

Figure 3:
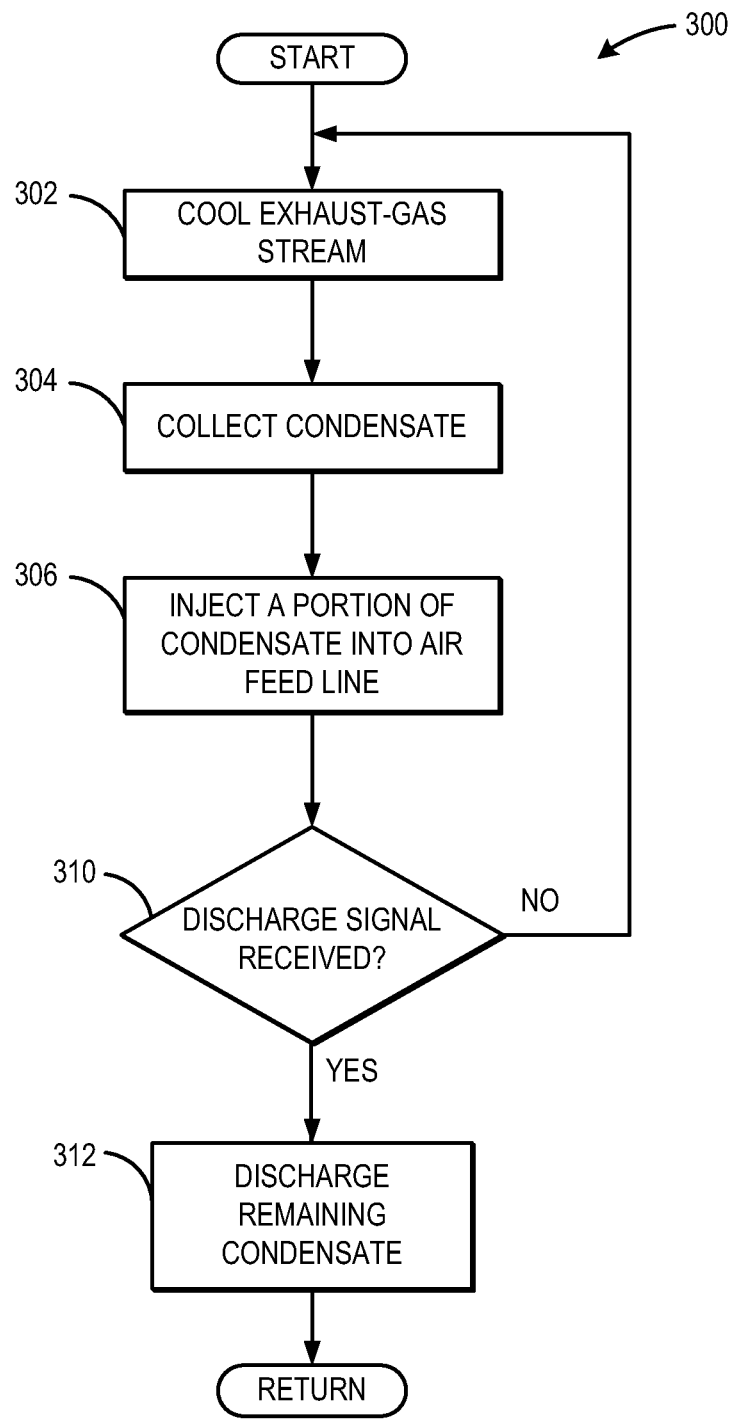
FIG. 3 shows an example flow chart of a method for injecting collected condensate according to present disclosure.

Turning now to the methods for injecting condensate into the air feed line according to the present disclosure, FIG. 3 shows an example flow chart of method 300 for injecting collected condensate during vehicle operation without EGR and discharging the condensate to the ambient environment outside of the vehicle responsive to a discharge signal. Thereby, problems associated with possible freezing of condensate on-board the vehicle are avoided. Thereby, the recirculation device herein may further include a discharge device coupled to the condensate collecting device that is configured to discharge the collected condensate in response to a discharge signal. In addition, to further alleviate the freezing of condensate on board the vehicle, embodiments are conceived wherein a buffer store is included in the recirculation device and used in combination with the recirculation device to further protect the condensate against freezing, for example, by using waste heat from the internal combustion engine for as long as the engine is in operation. As one example, the discharge signal may be triggered when a combustion apparatus equipped with the recirculation device is shut down, for example, when a motor vehicle is shut-off by the vehicle operator in a cold ambient environment.

At 302, method 300 includes cooling the exhaust-gas stream of the internal combustion engine to condense and separate off water vapor contained in the exhaust-gas stream. At 304, which may be performed in response to the cooling step above, method 300 further includes collecting the condensate in a condensate collecting device. For example, a condensate collecting device formed in the shape of a bowl may be included for storing collected condensate for later injection into the combustion air during vehicle operation. As such, at 306, method 300 further includes admixing the condensate into the combustion air of the internal combustion engine, for example, by injecting at least a portion of the condensate into the intake manifold in the manner noted above.

Because stored condensate (e.g., water) may have the potential of freezing when the ambient temperature falls below a temperature threshold, at 310, method 300 includes receiving a discharge signal indicating a temperature below a freezing threshold, and discharging at least a portion of the collected condensate to an ambient environment in response to the discharge signal. In this way, a controller may be configured to monitor a temperature of the recirculation device (not shown) and to send a discharge signal indicating that the condensate collection device is to be discharged or purged. If a discharge signal is not received at 310, method 300 may simply return to 302 by monitoring one or more engine conditions during the engine drive cycle. Alternatively, if a discharge signal is received at 310, method 300 proceeds to 312 and discharges or purges the collected condensate to reduce the risk of condensate freezing onboard the vehicle. In this way, method 300 may be used to protect the condensate from freezing, which poses a risk to structural elements on board the vehicle. Moreover, if the engine is started up again at a later point in time, the water to be used for admixing to the combustion air during operation may be regenerated and obtained by a renewed cooling of the exhaust-gas stream in the manner herein described.

Figure 4:
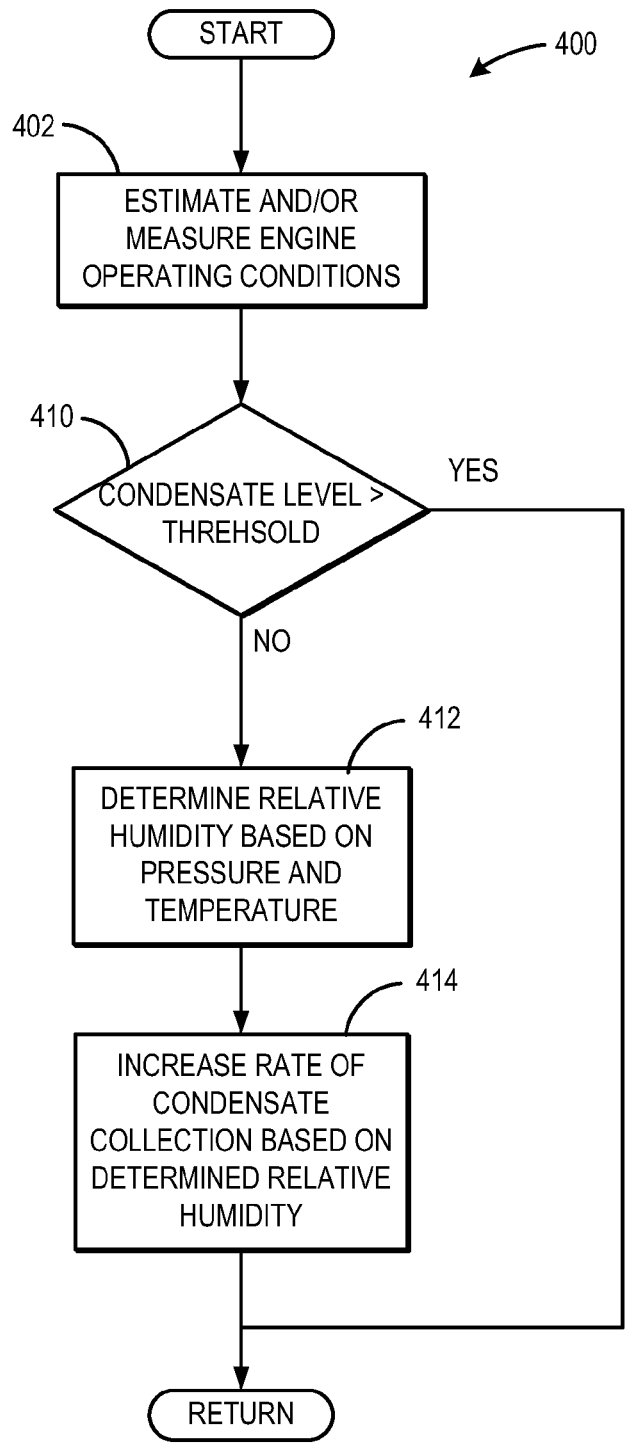
FIG. 4 shows an example flow chart for inducing a condensate formation during vehicle operation.

With regard to the formation of condensate, FIG. 4 shows an example flow chart of method 400 for generating condensate during vehicle operation. In one embodiment, a threshold may be present for indicating a volume above which enough condensate is present for injecting the condensate into the air feed line during vehicle operations. Likewise, the threshold further indicates a volume below which more condensate is to be generated. Therefore, method 400 illustrates how the rate of condensation may be increased in order to increase the amount of condensate stored within the condensate collecting device.

At 402, method 400 includes estimating and/or measuring engine conditions to determine whether favorable conditions are present for forming the condensate within the cooling unit of the recirculation device. Then, at 410, method 400 further includes determining a condensate level within the condensate collecting device. For example, in one embodiment, a fluid sensor may be included in the condensate collecting device (not shown) to determine a level of condensate present. If sufficient fluid is present such that an injection into the air feed line is allowable, then engine operations may continue without increasing the rate of condensate formation within the recirculation device. As such, controller 180 may make one or more adjustments while injecting the condensate during vehicle operations. Alternatively, if more condensate is to be formed, at 412, one or more pressure and temperature measurements may be taken to determine a relative humidity in the exhaust line. In this way, a dew point, which is the temperature below which the water vapor in air condenses into liquid water at a higher rate than the liquid water evaporates, can be determined and used to set a cooling temperature of cooling unit 6. Then, at 414, a rate of condensate formation within the recirculation device may be increased by reducing a temperature of the cooling device to the determined temperature based on the measured relative humidity. Although not described in greater detail, the condensate may be collected until the volume reaches an upper threshold that indicates the condensate collecting device has been filled to capacity. When the volume of the condensate exceeds this upper volume threshold, the process of condensing water vapor from the exhaust-gas may be stopped while the exhaust-gas is instead directed to the tailpipe outlet of the motor vehicle.

Figure 5:
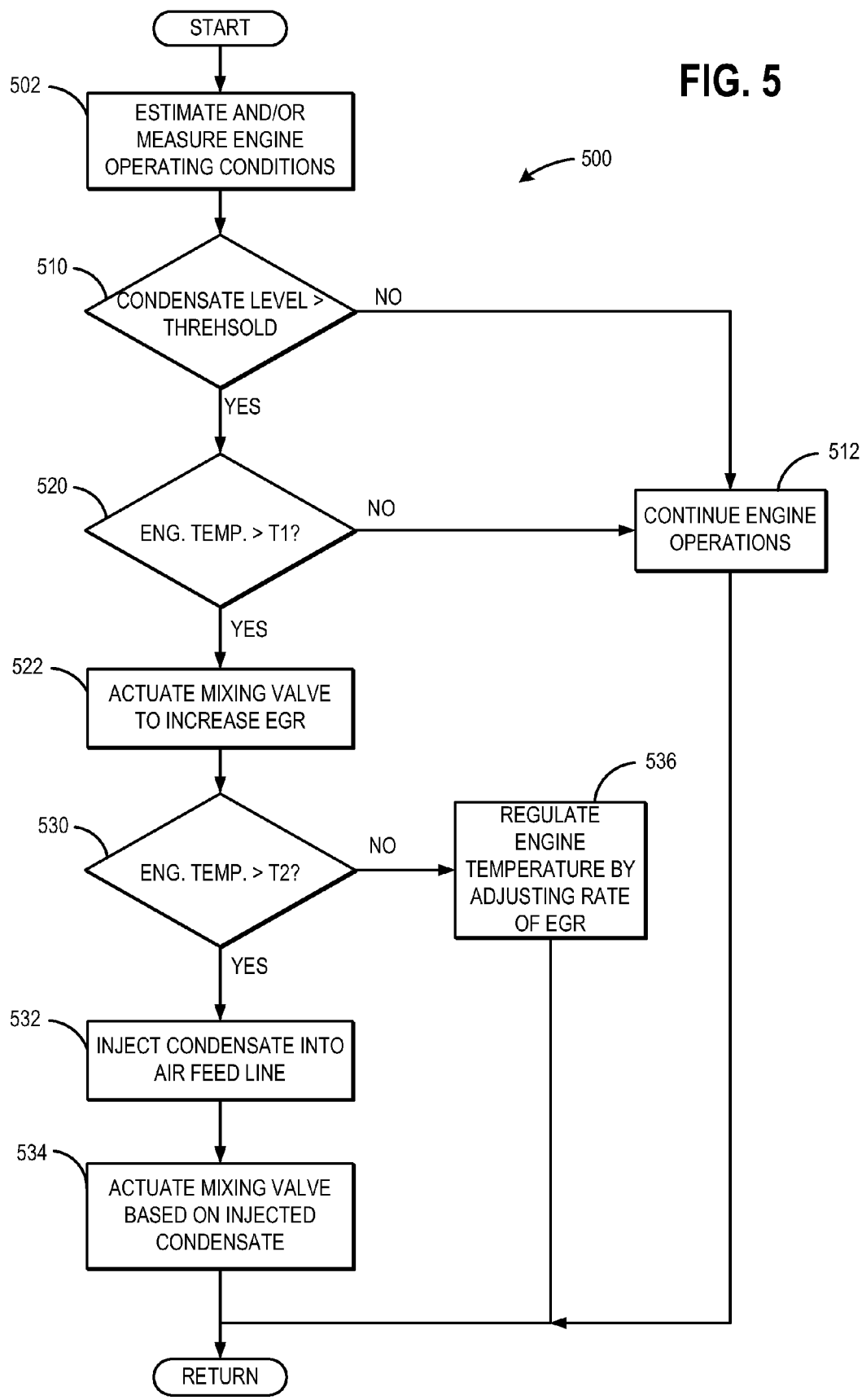
FIG. 5 shows an example flow chart of a method for injecting condensate in combination with EGR during vehicle operation.

Turning now to operation of the recirculation device to regulate a temperature of the engine, FIG. 5 shows an example flow chart of method 500 for injecting condensate collected into the air feed line during vehicle operations. In internal combustion engines, EGR is a NOx emissions reduction technique wherein a portion of an engine's exhaust is recirculated back to the engine cylinders. In a gasoline engine, the recirculated exhaust-gas displaces an amount of combustible matter in the cylinder. Alternatively, in a diesel engine, the exhaust-gas replaces some of the excess oxygen in the pre-combustion mixture. Because NOx forms primarily when a mixture of nitrogen and oxygen is subjected to high temperature, EGR lowers the combustion chamber temperature and thereby reduces the amount of NOx generated during the combustion process. Modern engines often include EGR to meet established emissions standards. The disclosed condensate recirculation device further includes regulating the engine temperature in combination with EGR using condensate collected on board the vehicle.

The method thus comprises recirculating a first portion of the exhaust-gas stream from an exhaust line to an air feed line (e.g., the air intake system) via one or more exhaust-gas recirculation lines; cooling a second portion of the exhaust-gas stream in a cooling unit located within a recirculation device that couples the exhaust line of the engine to the air feed line, wherein the recirculation device is located downstream of the one or more exhaust-gas recirculation lines located upstream and arranged parallel thereto; collecting condensate from the second portion of the exhaust-gas stream in a condensate collecting device; injecting an amount of the condensate collected into the air feed line based on one or more engine operating conditions; and adjusting a mixing valve to adjust a degree of exhaust-gas recirculation from the one or more exhaust-gas recirculation lines based on the amount of condensate injected. Here, the air feed line is designed to draw in combustion air and conduct it to the engine and the exhaust line is designed to discharge an exhaust-gas stream from the engine. As such, the method further includes directing a third portion of the exhaust-gas stream to an exhaust-gas outlet of the engine.

The recirculation device according to the present disclosure includes a cooling unit located within the exhaust line to cool at least a portion of the exhaust-gas stream of the engine flowing there through. The recirculation device further has a condensate collecting device to collect condensate that condenses out of the exhaust-gas stream cooled in the cooling unit, and an injection device for injecting said condensate that has been directed to the air feed line. As noted above, the system and methods according to the present disclosure is based on the insight that the exhaust gas of an internal combustion engine comprises a high fraction of water in the vapor form. Therefore, water can be obtained during vehicle operations and further used for regulating the engine temperature to reduce the amount of NOx emissions formed. The regulating of the engine temperature occurs through injection of the water formed and admixture into the combustion air of the internal combustion engine from the exhaust-gas of the internal combustion engine. In this way, the emission of nitrogen oxides can be reduced without using a water tank, which reduces the space requirement, the vehicle weight and the operating complexity for the driver, and substantially eliminates problems with regard to the freezing of the water store carried onboard.

Returning to the method, at 502, method 500 includes monitoring one or more vehicle operating conditions to determine when temperature conditions are favorable for NOx formation. Then, at 510, method 500 includes determining whether the amount of condensate present in the condensate collecting device (e.g., a condensate level) is greater than a volume threshold. If the condensate level falls below the threshold, controller 180 may be configured to increase the amount of condensate present by, for instance, setting a temperature within the cooling unit below the dew point to increase the rate of condensation by method 400 described above. Alternatively, if the amount of condensate present exceeds the threshold, controller 180 may simply inject a portion of condensate present into the air feed line based on the determined engine operating conditions.

As described herein, the recirculation device preferably has an EGR that is designed to recirculate at least a part of the exhaust-gas to the air feed line and admix said exhaust-gas to the combustion air. As noted already, EGR is a widespread technique for reducing the emissions of NOx from an engine system. The exhaust-gas recirculation means may also have one or more branches from the exhaust line. It is advantageously the case here that the branch or branches from the exhaust line is or are arranged upstream of the cooling unit. For instance, this offers the advantage that the water vapor contained in the exhaust gas is supplied directly to the exhaust-gas recirculation means, and that part of the exhaust gas that is conducted to the exhaust tailpipe has water extracted from it by condensation.

Further structural elements in the air feed line may comprise a compressor designed to compress the combustion air. Herein, the injection device is preferably arranged downstream of the compressor. In some instances, the pressure within the air feed line may be adjusted via the compressor and/or turbine of the engine to further enhance the condensate injecting, for example, by increasing an amount of condensate atomization based on the pressure differential thus obtained. The cooling unit may, for example, comprise a heat exchanger. The cooling unit may also comprise a meandering exhaust line in order to increase an exposed surface area of the cooling unit and lengthen a residence time of the exhaust gas in the cooling unit, whereby more intense cooling of the exhaust-gas stream is attained. The cooling unit may additionally or alternatively comprise a compression refrigerator or be designed such that it can be connected to a compression refrigerator. As will be described in more detail below, when this is the case, it is advantageous in particular for an air-conditioning system provided for the air conditioning of a vehicle interior to be connected to the cooling unit of the recirculation device for the purpose of cooling a vehicle cabin, because an enhanced cooling performance is attained without a significant increase in overall outlay.

In some embodiments, the condensate collecting device may further comprise a buffer store for the collected condensate. In other words, the condensate collecting device may further include a means for storing a buffer in some embodiments. Such a buffer store permits a compensation of rapidly changing requirements for the admixture of water. It is conceivable that, in the event of a brief increase in engine power, the condensate obtained by condensation from the exhaust-gas stream during said time period is not sufficient to realize optimum humidification of the mass flow of combustion air that has increased proportionally to the engine power, such that previously collected condensate stored in the buffer store is resorted to. Moreover, to avoid problems with regard to the possible freezing of the condensate, the recirculation device may be equipped with a discharge device connected to the condensate collecting device that is designed to discharge the collected condensate to the environment external to the vehicle in response to a discharge signal. This is expedient in particular in combination with a buffer store which can be protected against freezing by waste heat of the internal combustion engine for as long as the internal combustion engine is in operation. The discharge signal may in particular be triggered when a combustion apparatus equipped with the recirculation device is shut down, for example when a motor vehicle is shut down by the driver.

Continuing with the description of method 500 in view of the structural features just described, at 520, method 500 includes comparing an engine temperature to a first temperature threshold (T1) that indicates an elevated temperature within the engine system, and whereby a potential for increased NOx emissions may also be present based on elevated temperature relative to T1. For this reason, T1 may be advantageously relied upon to indicate when the EGR may adjust an amount of exhaust gas recirculation by reducing the temperature of the engine in order to reduce NOx emissions therefrom, for example, by displacing a portion of the combustible components therein. At 522, method 500 includes adjusting or actuating a mixing valve to adjust an amount of EGR. For example, because the measured engine temperature is greater than T1, controller 180 may actuate mixing valve 14 to increase a degree of opening in order to increase the amount of exhaust-gas recirculated in the engine system. In this way, the temperature of the engine may be brought back into a desired operating range while reducing the amount of NOx emissions therefrom. Alternatively, if the condensate level within condensate collecting device 7 is sufficient for injection into the engine system while the engine temperature falls below T1 that indicates NOx emissions below an acceptable level, method 500 may proceed to 512 while continuing vehicle operations, and while further monitoring a condensate level to determine whether the amount of condensate formed is to be increased based on one or more engine and/or ambient conditions.

Continuing to 530, method 500 is also shown including a second temperature threshold (T2) that indicates a temperature level above which more active measures are to be taken to reduce the engine temperature, and thereby the NOx emissions. Condensate, which is substantially water, has a greater ability to absorb heat than air alone (e.g., oxygen, nitrogen, etc.) because water (e.g., water vapor) has a higher heat capacity than air. For this reason, injecting condensate into the air feed line allows for the temperature of the internal combustion engine to be more aggressively reduced as the engine temperature increases beyond the second threshold indicated. As such, at 532, method 500 further includes injecting condensate into the air feed line for admixing with the combustion air that is directed into one or more engine cylinders in combination with EGR. A drawback of using EGR is that the exhaust gas emitted from one or more engine cylinder may also have an elevated temperature since the exhaust-gas is the remnant of the combustion process within the engine. Therefore, the amount of EGR may be reduced in response to the condensate injected to lower the engine temperature. As such, at 534, controller 180 cools the engine by actuating mixing valve 14 to reduce the amount of exhaust-gas recirculated based on the condensate injection. For example, the amount of EGR may be reduced responsive to the amount of condensate injected. Thereafter, the amount of EGR and condensate injected may be managed based on engine operating conditions to further manage the NOx emissions.

Figure 6:
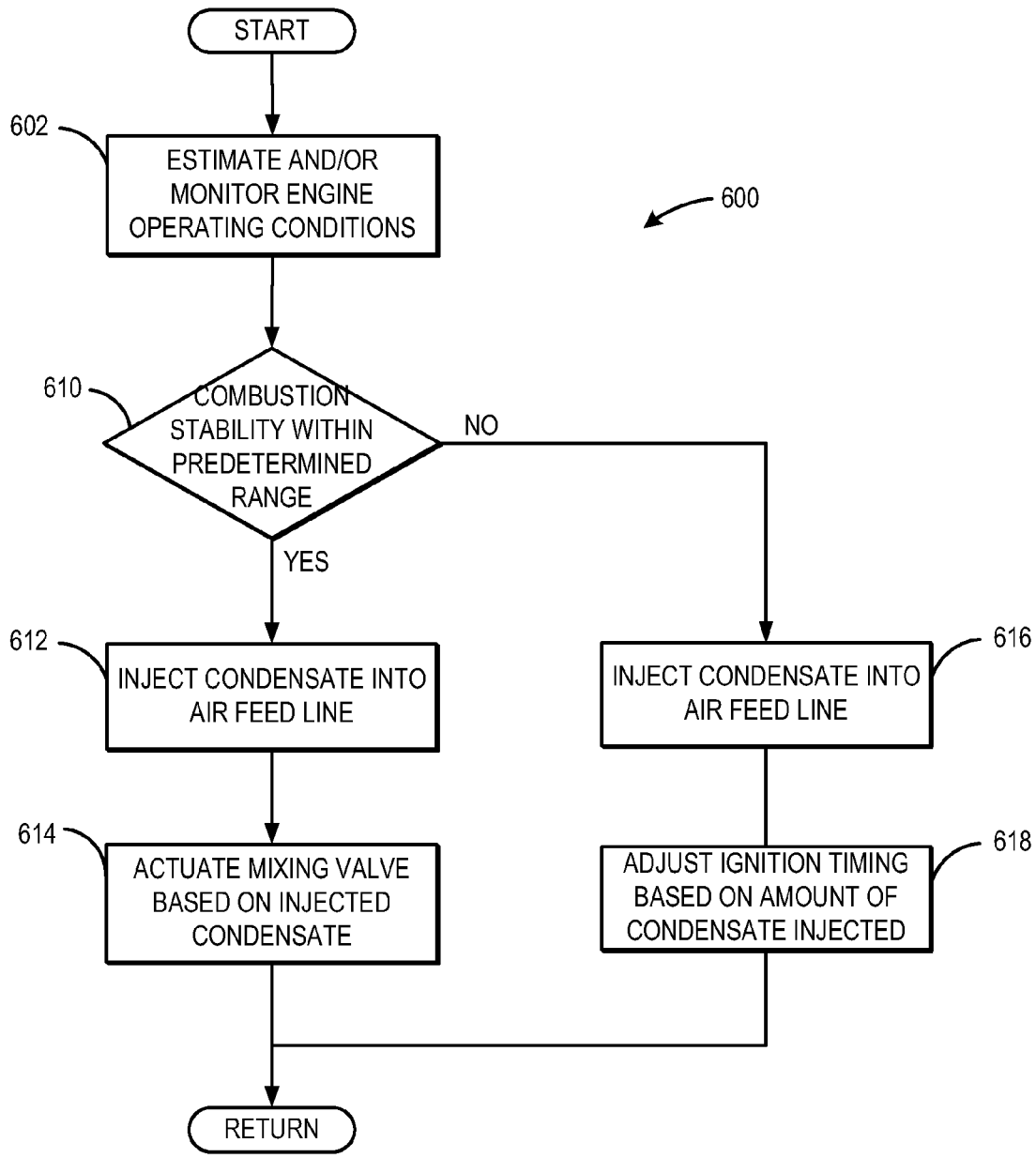
FIG. 6 shows a flow chart illustrating a method for injecting the collected condensate based on a combustion stability.

FIG. 6 shows an example flow chart of method 600 for injecting collected condensate based on a combustion stability in the engine. In order to maintain combustion stability during an injection period, some engine parameters may be altered to maintain torque demand throughout the injection procedure, which may be held within certain thresholds. Example parameters that may be adjusted include spark timing, alternator load, VCT, and AFR. Therefore, additional thresholds may be set such that these parameters are not increased or decreased outside of their thresholds for combustion stability. For example, a spark threshold may be set so that spark retard is not increased above a level that causes combustion instability. For this reason, method 600 includes determining a combustion stability in conjunction with the condensate injection.

At 602, method 600 includes estimating and/or monitoring engine operating conditions. Then, at 610, method 600 also includes determining the combustion stability relative to a predetermined range for the current vehicle operating conditions. Although the predetermined range is described simply for clarity, in some implementations, various embodiments may be used to determine a combustion stability. For example, in one embodiment, controller 180 may include a look-up table of the example parameters just described in combination with other engine operating parameters (e.g., an engine temperature) in order to determine acceptable bounds for condensate injection. The goal is to make operational adjustments without severely impacting the engine drive cycle, for example, by introducing an engine knock.

If the combustion stability falls within a predetermined range, at 612, method 600 includes injecting the condensate into the air feed line based on one or more engine operating parameters. Then, at 614, method 600 further includes adjusting an EGR by actuating mixing valve 14 based on the condensate injection as described above.

Alternatively, if the combustion stability falls outside of the predetermined range such that a condensate injection may disrupt a combustion stability beyond the bounds of the predetermined range, method 600 includes making one or more engine adjustments while performing the condensate injection to maintain stable combustion operations while also reducing NOx emissions. As such, at 616 and 618, method 600 includes performing the condensate injection while also adjusting an engine parameter to maintain combustion stability. For example, at 618, method 600 is shown including adjusting an ignition or spark timing based on the amount of condensate injected to maintain a stable combustion, and therefore engine operation, during vehicle operations. Although the injection is shown as occurring before the adjustment of the engine, in some embodiments, the engine adjustment may be made before the injection. Alternatively, the engine adjustments and condensate injection may also be made simultaneously to ensure a stable combustion is maintained during vehicle operations. The objective is to reduce NOx emissions while maintaining a satisfactory vehicle operating experience, e.g., so the vehicle operator remains unaware of the various operational adjustments made during operation.

Figure 7:
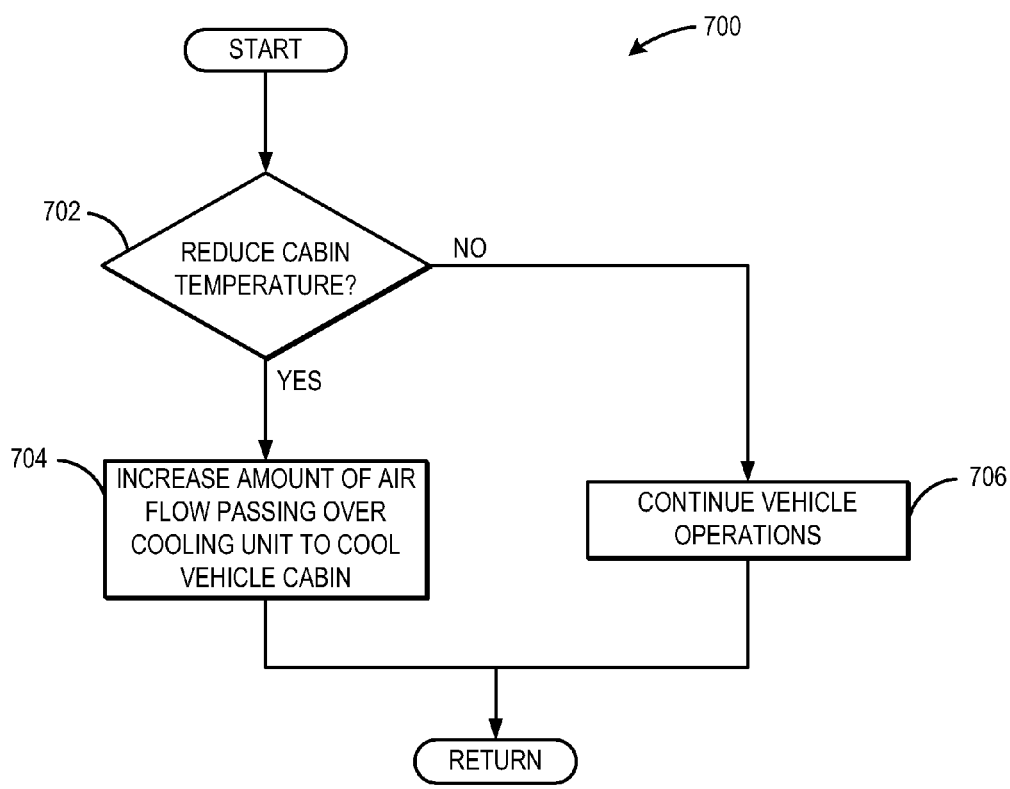
FIG. 7 shows an example flow chart for cooling a vehicle cabin environment with an airflow that is directed over the cooling unit of the disclosed recirculation device.

A second aspect of the present disclosure relates to connecting the cooling unit of the recirculation device to an air-conditioning system of the motor vehicle. Therefore, FIG. 7 shows an example flow chart for cooling a vehicle cabin. As such, the method further includes directing a flow of air over the cooling unit of the recirculation device via the air-conditioning system and into a vehicle cabin to lower the cabin temperature using the airflow passed over the cooling unit. As noted above, the disclosure herein relates to a combustion apparatus having an internal combustion engine and a recirculation device connected to the internal combustion engine. Furthermore, the description relates to a motor vehicle having a combustion apparatus of said type. In the motor vehicle, the recirculation device is preferably designed such that it can be connected to a compression refrigerator. Here, the cooling unit of the recirculation device is connected to an air-conditioning system of the motor vehicle.

At 702, method 700 includes determining whether a cabin temperature is to be reduced via cooling. For example, a vehicle operator may desire a cooler cabin temperature on a warm, summer afternoon. As such, the vehicle operator may adjust a temperature knob to indicate a set temperature desired within the cabin. Then, at 704, controller 180 may adjust an airflow passed over the cooling unit (e.g., by increasing the airflow) through the use of a grille shutter system or a cooling fan. For example, the opening of the grill shutters may be increased so as to increase the external cooling airflow through the air-conditioning system and thereby decrease the cabin temperature. Alternatively, if the cabin temperature is to be maintained, at 706, vehicle operations may be continued without making any additional adjustments.

Figure 8:
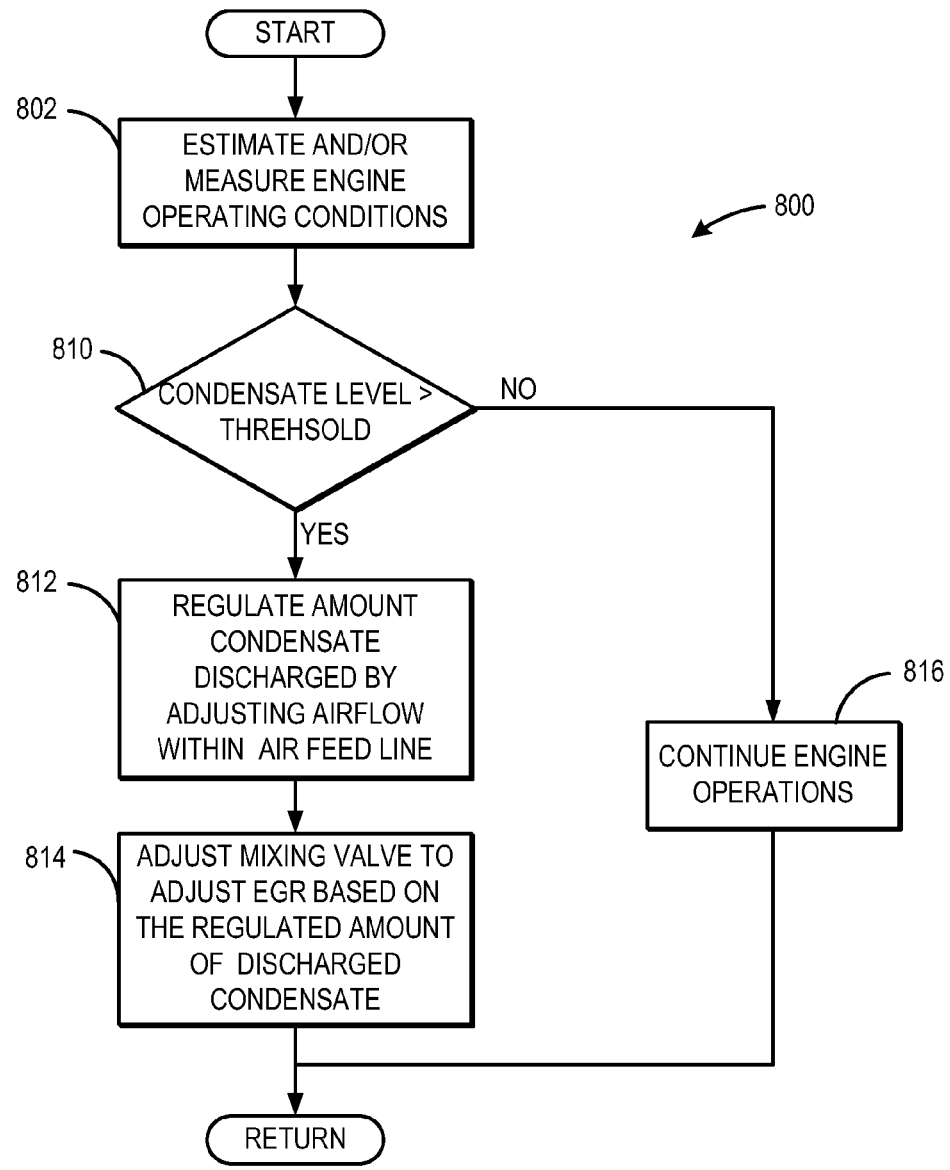
FIG. 8 is an example flow chart of an embodiment wherein the injection is based on a venturi flow.

A further aspect of the present disclosure includes using a flow of air within the air feed line to control the condensate discharged into the line. As such, FIG. 8 shows an example flow chart of an embodiment wherein the injection is based on the Venturi effect. Thereby, the amount of the injection is determined based on a pressure differential due to the flow of air through the air feed line that passes by the condensate line coupling exhaust line 5 to air feed line 4 that includes the condensate collecting device 7. Therefore, the method according to the present disclosure allows for further simplifications since a condensate injector may be omitted in some instances.

At 802, method 800 includes monitoring one or more engine operations in the same manner described above. Then, at 810, method 800 includes determining a condensate level to further determine whether enough condensate exists for use within the engine system. If the condensate level exceeds a threshold, at 812, method 800 may regulate the amount of condensate discharged from the recirculation device by adjusting an airflow within the air feed line. For example, the position of throttle plate 292 may be increased to further increase a throttle position which allows for a greater flow of air through the air feed line. In response, a greater amount of discharge may result based on the greater flow of air that passes by the condensate line via the air feed line. At 814, method 800 further includes adjusting mixing valve 14 to adjust the amount of EGR based on the discharged condensate as described above with respect to the injecting of condensate via an injection device.

Returning to 810, if the condensate level falls below the threshold such that the amount of condensate within the recirculation device is insufficient for the described methods, method 800 proceeds to 816 while continuing engine operations based on a desired engine output. Therefore, as was described above with respect to FIG. 4, controller 180 may increase a condensate level by increasing the rate of condensation. Then, once sufficient condensate has been collected to enable the described methods, operations may be further continued as described above. In one conceived embodiment, the condensate may be used as it collects within condensate collecting device 7. In this way, when a low condensate level is detected, vehicle operations may simply continue while the engagement of the injection/discharge system is delayed for a time period that depends on the generation of more condensate according to the methods described herein.

In this way, the system according to the present disclosure makes it possible, with little outlay, to utilize an injection of water into the combustion air of the internal combustion engine for the purpose of reducing nitrogen oxide emissions. In particular, the outlay for storage of water and the regular replenishment of the water tank can be eliminated. The recirculation device is thus particularly attractive for use in passenger motor vehicles. The system and methods further provide for operating a combustion apparatus, wherein the methods include cooling an exhaust-gas stream of an internal combustion engine of the combustion apparatus; collecting condensate from the cooled exhaust-gas stream; and admixing the collected condensate to combustion air for the internal combustion engine.

In another representation, a method comprises cooling exhaust gas with a cooler and collecting condensate therein, the condensate directed through a first line and delivered to intake air (where the line directing only liquid condensate and not exhaust gas); while recirculating exhaust gas through a second line to the intake in parallel with the first line, the second line upstream of the first line.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine of a vehicle, comprising:
an air feed line,
an exhaust line for discharging exhaust-gas,
a mixing valve,
a recirculation device that couples the exhaust line and the air feed line, the recirculation device including a cooling unit for cooling the exhaust-gas stream, a condensate collecting device for collecting condensate out of the exhaust-gas stream, and an injection device for injecting said condensate back into the air feed line,
an exhaust-gas recirculation system, wherein the exhaust-gas recirculation system includes one or more branches off of the exhaust line, and wherein the one or more branches off of the exhaust line are arranged upstream of the cooling unit,
wherein the cooling unit of the recirculation device is coupled to an air-conditioning system of the vehicle, and
a controller with executable instructions stored in non-transitory memory for injecting condensate via the injection device, and if combustion stability is within a predetermined range, actuating the mixing valve to adjust a degree of exhaust-gas recirculation from one or more exhaust-gas recirculation lines based on an amount of condensate injected, and otherwise, adjusting ignition timing based on the amount of condensate injected.

2. The engine of claim 1, further including a compressor within the air feed line, wherein the injection device is arranged downstream of the compressor.

3. The engine of claim 1, wherein the exhaust line within the cooling unit meanders to increase an exposed surface area of the exhaust line while increasing a residence time of the exhaust-gas within the cooling unit.

4. The engine of claim 1, wherein the cooling unit comprises at least one of a heat exchanger and a compression refrigerator.

5. The engine of claim 1, wherein the cooling unit is configured to connect to a compression refrigerator.

6. The engine of claim 1, wherein the instructions further include instructions to determine humidity, and increase condensate collection in response to the determined humidity.

7. The engine of claim 6, wherein a discharge device is included within the condensate collecting device to discharge at least a portion of condensate to an ambient environment in response to a discharge signal.

8. The engine of claim 7, wherein the instructions further include instructions to discharge the condensate during an engine drive cycle.

9. A method for regulating an engine temperature of an engine in a vehicle, comprising:
recirculating a first portion of an exhaust-gas stream from an exhaust line to an air feed line via one or more exhaust-gas recirculation lines;
cooling a second portion of the exhaust-gas stream in a cooling unit of a recirculation device that couples the exhaust line of the engine to the air feed line, wherein the recirculation device is located downstream of the one or more exhaust-gas recirculation lines, and wherein the recirculation device is arranged parallel to the one or more exhaust-gas recirculation lines;
collecting condensate from the second portion of the exhaust-gas stream in a condensate collecting device;
injecting an amount of the condensate collected into the air feed line based on one or more engine operating conditions;
adjusting a mixing valve to adjust a degree of exhaust-gas recirculation from the one or more exhaust-gas recirculation lines based on the amount of condensate injected;
directing a flow of air over the cooling unit of the recirculation device via an air-conditioning system of the vehicle and into a vehicle cabin to lower cabin temperature using the airflow passed over the cooling unit; and
adjusting the airflow passed over the cooling unit through use of a grille shutter system of the vehicle, including increasing opening grille shutters to increase external cooling airflow through the air-conditioning system and thereby decreasing the cabin temperature.

10. The method of claim 9, further including directing a third portion of the exhaust-gas stream to an exhaust-gas outlet of the engine.

11. The method of claim 10, wherein the first portion of the exhaust-gas stream is recirculated without injecting condensate in response to an engine temperature exceeding a first temperature threshold.

12. The method of claim 11, wherein condensate is injected in combination with the first portion of the exhaust-gas stream in response to an engine temperature exceeding a second temperature threshold.

13. The method of claim 9, wherein the injecting of condensate into the air feed line is based on a flow of air through the air feed line.

14. A method for an engine, comprising:
cooling an engine exhaust-gas stream with a cooling unit within a condensate recirculation device coupling an exhaust line to an air intake system;
collecting condensate from the cooled exhaust-gas stream in a condensate collecting device;
increasing a condensate collection rate based on determined relative humidity;
introducing the collected condensate into the air intake system to admix with an airflow while admixing recirculated exhaust-gas in parallel to the condensate admixing; and
determining a condensate level within the condensate collecting device, where if sufficient fluid is present such that an injection into an air feed line is allowable, then continuing engine operations without increasing a rate of condensate formation within the condensate recirculation device, and alternatively if more condensate is to be formed, the determined relative humidity in the exhaust line is used to set a cooling temperature of the cooling unit, where the rate of condensate formation within the condensate recirculation device is increased by reducing a temperature of the cooling unit to the determined temperature based on the relative humidity.

15. The method of claim 14, further including adjusting an amount of condensate directed to the air intake system based on an amount of exhaust-gas recirculation, wherein the exhaust-gas is recirculated via a line located upstream of the condensate recirculation device and arranged parallel thereto.

16. The method of claim 15, wherein the amount of exhaust-gas recirculation is reduced responsive to an increase in the amount of condensate introduced into the air intake system.

17. The method of claim 16, further including receiving a discharge signal indicating a temperature below a freezing threshold, and discharging at least a portion of the collected condensate to an ambient environment in response to the discharge signal.

18. A method comprising:
cooling exhaust gas of an engine of a vehicle with a cooler coupled to an engine exhaust line and collecting liquid condensate in the cooler, the liquid condensate directed through a first line coupling the cooler with an engine air intake line and injected into the air intake line, the first line directing only the liquid condensate and not exhaust gas; while recirculating exhaust gas through a second line from the exhaust line to the air intake line in parallel with the first line, the second line coupled to the exhaust line upstream of the cooler and further coupled to the air intake line downstream of the coupling of the first line to the air intake line;
adjusting an EGR valve in the second line responsive to an amount of the liquid condensate injected; and
directing a flow of air over the cooler via an air-conditioning system of the vehicle and into a cabin of the vehicle to lower cabin temperature using the flow of air directed over the cooler.

* * * * *